United States Patent [19]

Fidanza et al.

[11] Patent Number: 5,799,258
[45] Date of Patent: Aug. 25, 1998

[54] WHEELCHAIR MONITORING SYSTEM

[76] Inventors: Andre Fidanza, 190 Main Street E., Hamilton, Ontario, Canada, L8L 5M8; Marco Dicioccio, 123 James St. N., Hamilton, Ontario, Canada, L8R 2K8

[21] Appl. No.: 605,721

[22] Filed: Feb. 22, 1996

[51] Int. Cl.⁶ .................................. G06F 7/70; B62D 11/00
[52] U.S. Cl. ........................ 701/1; 180/6.5; 180/65.5; 180/907
[58] Field of Search ............... 364/424.045, 423.098, 364/424.059, 424.016; 180/167, 907, 251, 210, 65.2, 65.1, 65.6, 65.8, 69.6, 8.2, 6.5, 272, 287, 65.5; 280/98, 5.22, 6.1, 250.1, 304.1; 318/562, 600, 139, 110, 60, 67, 269; 73/1.37, 379.06

[56] References Cited

U.S. PATENT DOCUMENTS

| | | | |
|---|---|---|---|
| 4,050,533 | 9/1977 | Seamone | 180/6.5 |
| 4,207,959 | 6/1980 | Youdin et al. | 180/167 |
| 4,233,844 | 11/1980 | Dreisinger et al. | 73/379.06 |
| 4,407,393 | 10/1983 | Youdin et al. | 180/167 |
| 4,415,049 | 11/1983 | Wereb | 180/6.5 |
| 4,549,624 | 10/1985 | Doman | 180/6.28 |
| 4,794,999 | 1/1989 | Hester | 180/907 |
| 5,123,495 | 6/1992 | Littlejohn et al. | 180/9.32 |
| 5,137,102 | 8/1992 | Houston, Sr. et al. | 180/65.5 |
| 5,234,066 | 8/1993 | Ashinh et al. | 180/11 |
| 5,248,007 | 9/1993 | Watkins et al. | 180/9.32 |
| 5,253,724 | 10/1993 | Prior | 180/65 |
| 5,274,311 | 12/1993 | Littlejohn et al. | 318/562 |
| 5,335,741 | 8/1994 | Rabinovitz et al. | 180/8.2 |
| 5,350,032 | 9/1994 | Smith | 180/65.6 |
| 5,495,904 | 3/1996 | Zwaan et al. | 180/11 |
| 5,547,038 | 8/1996 | Madwed | 180/253 |
| 5,649,883 | 7/1997 | Mayes et al. | 482/54 |

*Primary Examiner*—Jacques H. Louis-Jacques

[57] ABSTRACT

A wheelchair monitoring system including a sensor adapted to actuate upon a single rotation of a wheel of a conventional wheelchair. A sensor couple is included for securing the sensor adjacent to the wheel of the wheelchair. A display is coupled to the wheel chair for depicting a plurality of numerals. Finally, an information mechanism is connected to the sensor and display. The information mechanism is adapted to calculate a distance the wheelchair travelled and a speed of the wheelchair by monitoring the number and rate of actuation of the sensor, respectively. The information mechanism is further adapted to depict on the display the distance upon a first depression of a switch button and depict the speed upon a second depression thereof.

2 Claims, 4 Drawing Sheets

WHEELCHAIR MONITORING SYSTEM

BACKGROUND OF THE INVENTION

1. Field of the Invention

The present invention relates to a wheelchair monitoring system and more particularly pertains to affording a plurality of features including a speedometer and resetable trip meter to a user of a wheelchair.

2. Description of the Prior Art

The use of monitoring devices is known in the prior art. More specifically, monitoring devices heretofore devised and utilized for the purpose of calculating the speed and distance traveled by a vehicle are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 4,233,844 to Dreisinger; U.S. Pat. No. 4,007,419 to Jasmine; U.S. Pat. No. Des. 278,210 to Tsuyama; U.S. Pat. No. 5,105,150 to Liu; U.S. Pat. No. 4,491,007 to Crowdes, Jr.; U.S. Pat. No. 4,532,594 to Hosaka et al.; and U.S. Pat. No. 4,186,296 to Crump, Jr. are provided as being of general interest.

In this respect, the wheelchair monitoring system according to the present invention substantially departs from the conventional concepts and designs of the prior art, and in so doing provides an apparatus primarily developed for the purpose of affording a plurality of features including a speedometer and resetable trip meter to a user of a wheelchair.

Therefore, it can be appreciated that there exists a continuing need for a new and improved wheelchair monitoring system which can be used for affording a plurality of features including a speedometer and resetable trip meter to a user of a wheelchair. In this regard, the present invention substantially fulfills this need.

SUMMARY OF THE INVENTION

In view of the foregoing disadvantages inherent in the known types of monitoring devices now present in the prior art, the present invention provides an improved wheelchair monitoring system. As such, the general purpose of the present invention, which will be described subsequently in greater detail, is to provide a new and improved wheelchair monitoring system which has all the advantages of the prior art and none of the disadvantages.

To attain this, the present invention essentially comprises a standard wheelchair control mechanism situated at a rear extent of a conventional wheelchair and connected to a standard battery supply. The wheelchair control mechanism is adapted to allow controlled movement of the wheelchair with an associated joy stick which is connected thereto. Also included is a magnet sensor with a cylindrical configuration. The magnet sensor is adapted to actuate upon the placement of a magnet adjacent thereto. For holding the magnet sensor in its operative orientation, a sensor couple is included. In a preferred operative orientation, the sensor couple has a front surface, a rear surface, a top face, a bottom face, and a pair of side edges. The sensor couple comprises a first semicircular axial bore vertically formed on the rear surface thereof. A second semicircular axial bore is horizontally formed on a lower extent of the rear surface, whereby the semicircular bores form an intersection with an aperture situated at an apex thereof. The aperture allows the insertion of a coupling screw therethrough. The sensor couple further includes a first full axial bore horizontally formed therein at an upper extent thereof and extended between the side edges. Intersecting the first full bore is a second axial bore horizontally formed in the housing and extended between the front surface and rear surface. An aperture is situated at the intersection of the full bores and allows the insertion of a coupling screw therein from the top face. The sensor couple is adapted to allow the securement thereof to any one of a plurality of wheelchairs. In an operative orientation, one of the semicircular bores is attached to a frame of the wheelchair adjacent to a side extent thereof and the magnet sensor is insertably coupled within one of the full bores so that it faces outwardly from the side extent of the wheelchair frame in a horizontal direction. A magnet couple having a generally rectangular configuration is also included. In a preferred operative orientation, the magnetic couple has a front surface, a rear surface, a top face, a bottom face, and a pair of side edges. The magnet couple includes a magnet attached to a first side edge thereof, a groove formed on a second side edge for receiving a conventional spoke of a conventional wheelchair wheel, and an aperture formed between the front surface and the groove. The aperture is adapted to allow the insertion of a coupling screw for allowing the securement of the magnet in an ideal position whereby it passes adjacent to the magnet sensor upon the revolution of the wheel thus allowing the activation thereof. A display is connected to the standard control mechanism for depicting a plurality of numerals. A primary switch button is connected to the standard control mechanism and adapted to actuate upon the depression thereof. Finally, an information mechanism is connected to the control mechanism and magnet sensor. The information mechanism is adapted to calculate a distance the wheelchair travelled and a speed of the wheelchair by monitoring the number and rate of actuation of the magnet sensor, respectively. The information mechanism is further adapted to depict on the display the distance upon a first depression of the primary switch button and further depict the speed upon a second depression thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wheelchair monitoring system which has all the advantages of the prior art monitoring devices and none of the disadvantages.

It is another object of the present invention to provide a new and improved wheelchair monitoring system which may be easily and efficiently manufactured and marketed.

It is a further object of the present invention to provide a new and improved wheelchair monitoring system which is of a durable and reliable construction.

An even further object of the present invention is to provide a new and improved wheelchair monitoring system which is susceptible of a low cost of manufacture with regard to both materials and labor, and which accordingly is then susceptible of low prices of sale to the consuming public, thereby making such wheelchair monitoring system economically available to the buying public.

Still yet another object of the present invention is to provide a new and improved wheelchair monitoring system which provides in the apparatuses and methods of the prior art some of the advantages thereof, while simultaneously overcoming some of the disadvantages normally associated therewith.

Still another object of the present invention is to afford a plurality of features including a speedometer and resetable trip meter to a user of a wheelchair.

Lastly, it is an object of the present invention to provide a new and improved wheelchair monitoring system including a sensor adapted to actuate upon a single rotation of a wheel of a conventional wheelchair. A sensor couple is included for securing the sensor adjacent to the wheel of the wheelchair. A display is coupled to the wheel chair for depicting a plurality of numerals. Finally, an information mechanism is connected to the sensor and display. The information mechanism is adapted to calculate a distance the wheelchair travelled and a speed of the wheelchair by monitoring the number and rate of actuation of the sensor, respectively. The information mechanism is further adapted to depict on the display the distance upon a first depression of a switch button and depict the speed upon a second depression thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
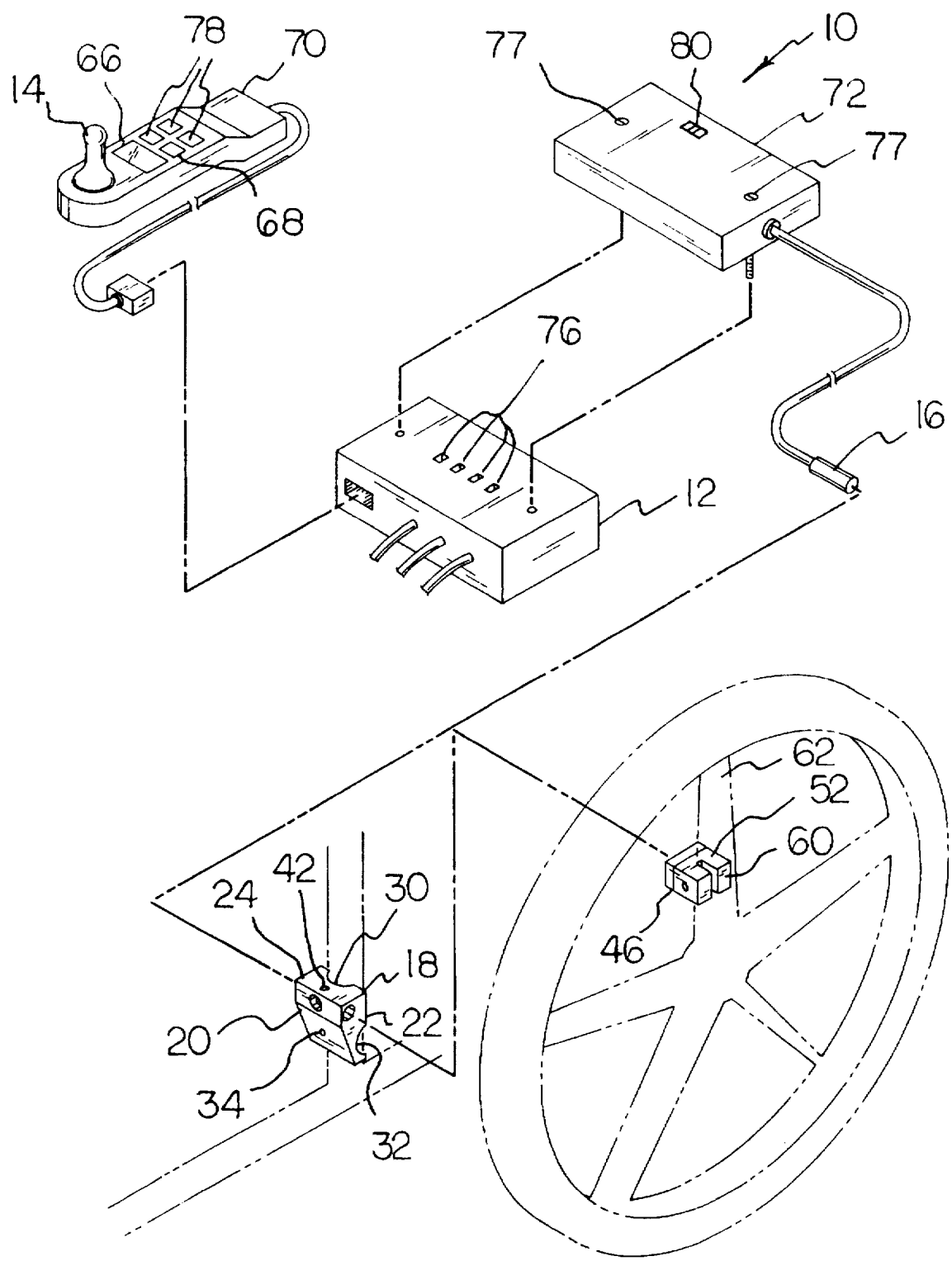
FIG. 1 is a perspective illustration of the preferred embodiment of the wheelchair monitoring system constructed in accordance with the principles of the present invention.
Figure 2:
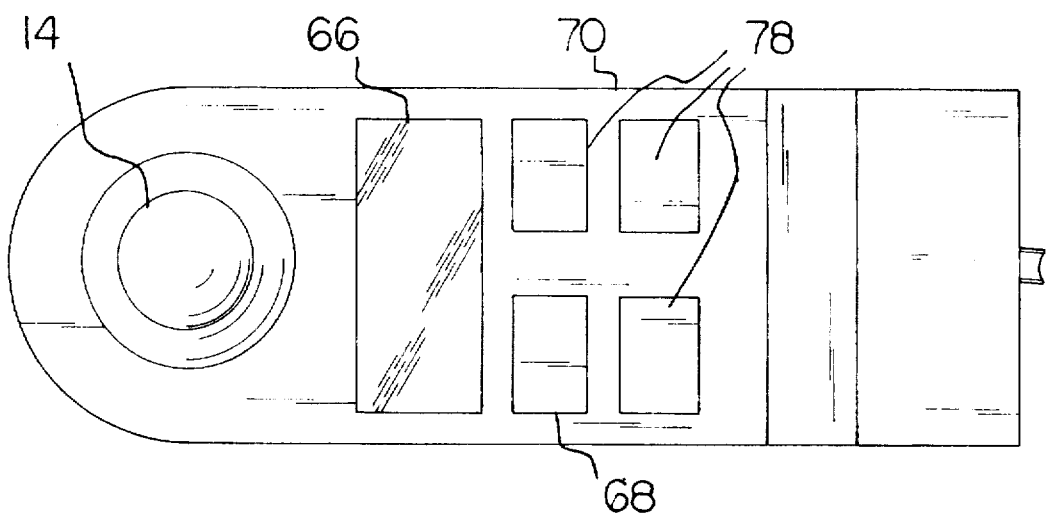
FIG. 2 is a top plan view of the interface housing.
Figure 3:
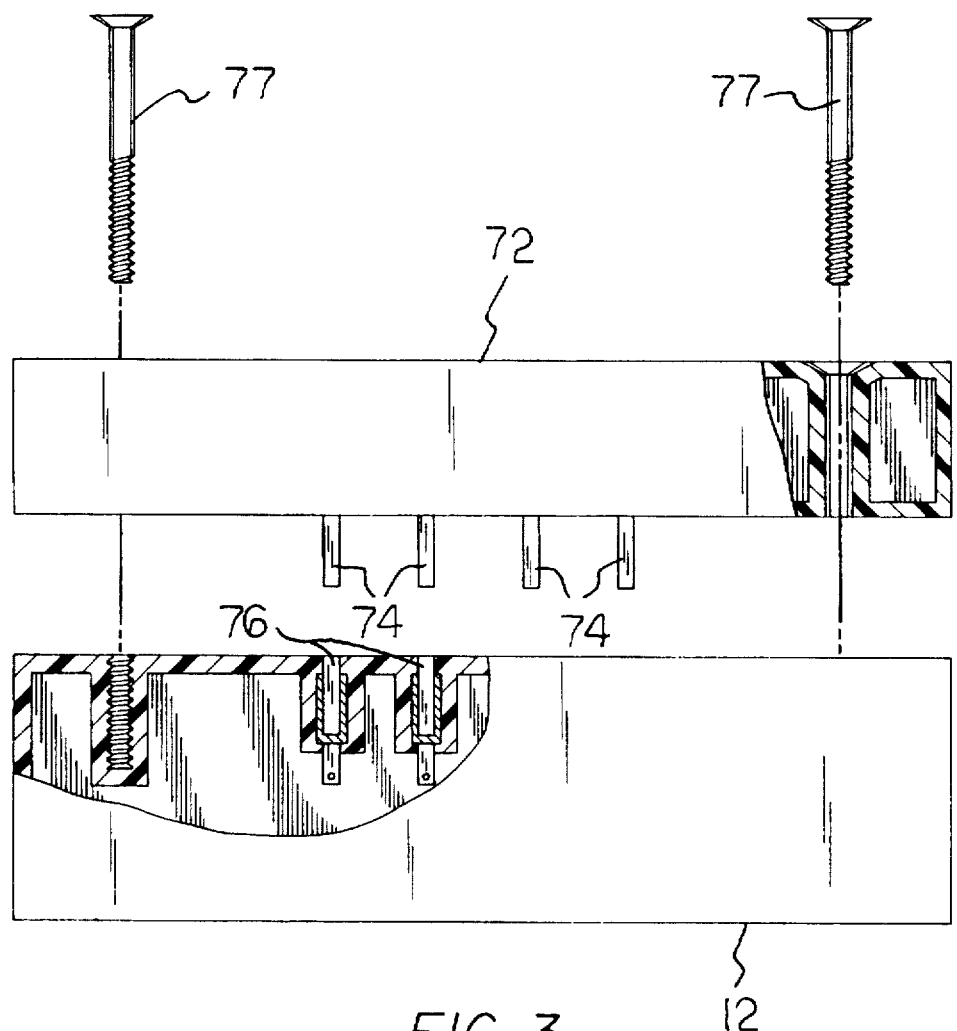
FIG. 3 is a side plan view of the interconnection between the control mechanism and information mechanism.
Figure 4:
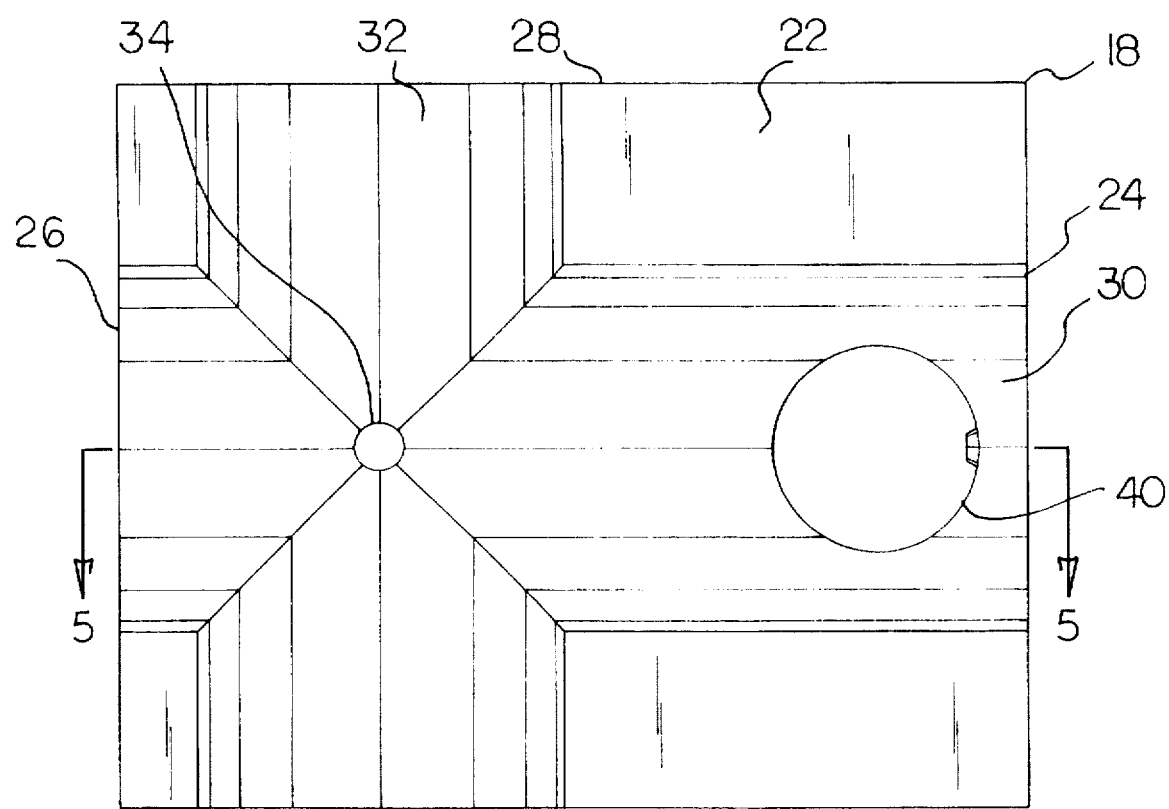
FIG. 4 is a plan view of the rear surface of the sensor couple.
Figure 5:
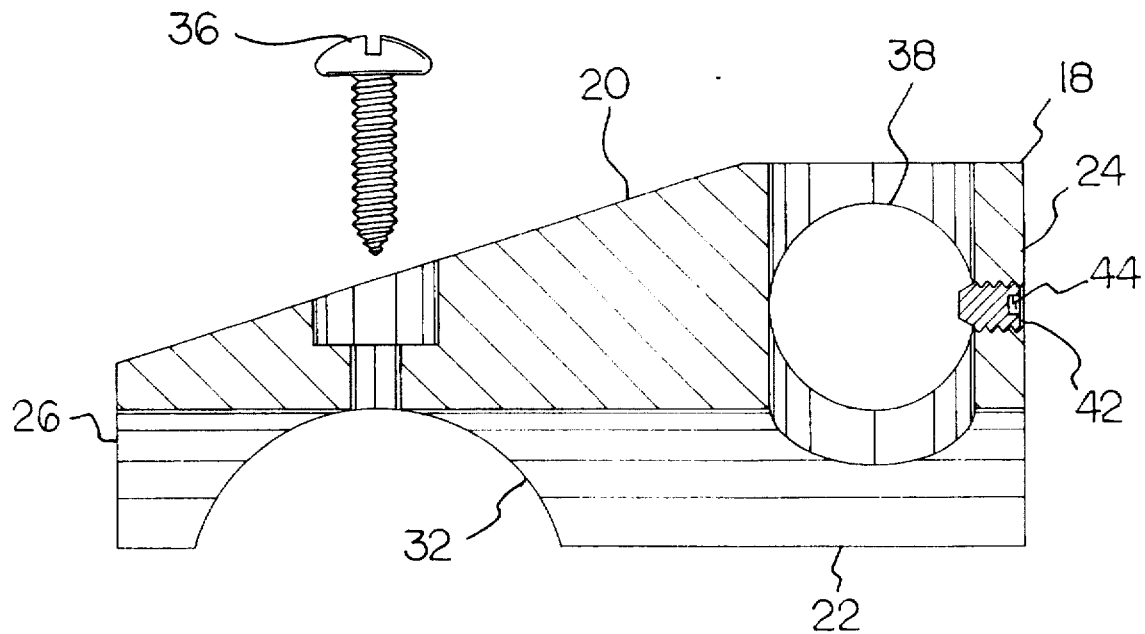
FIG. 5 is a cross-sectional view taken along line 5—5 depicted in FIG. 4.
Figure 6:
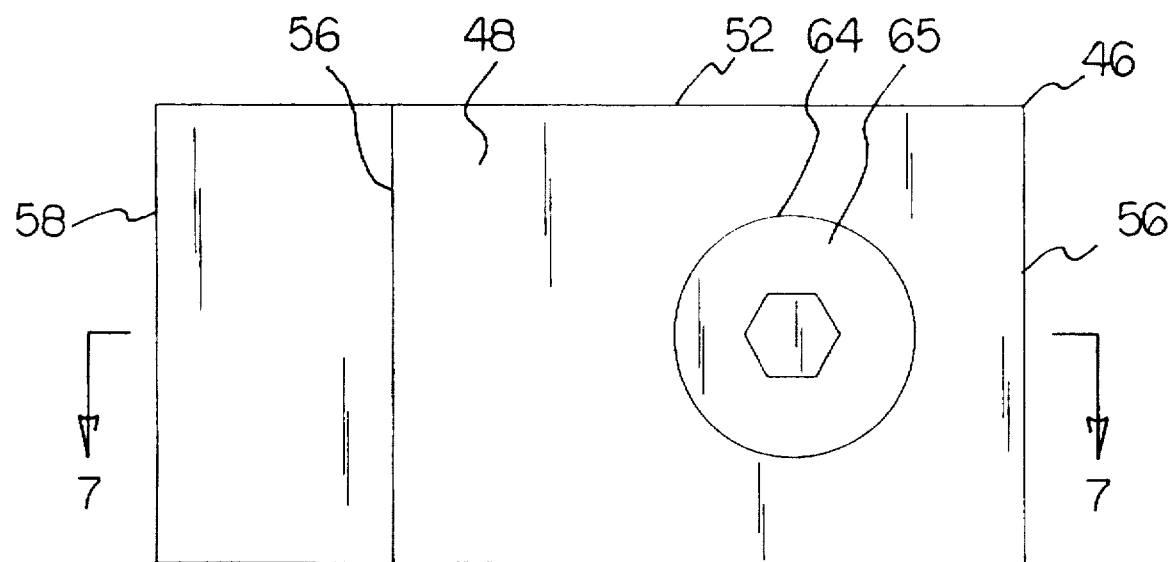
FIG. 6 is a plan view of the front surface of the magnet couple.
Figure 7:
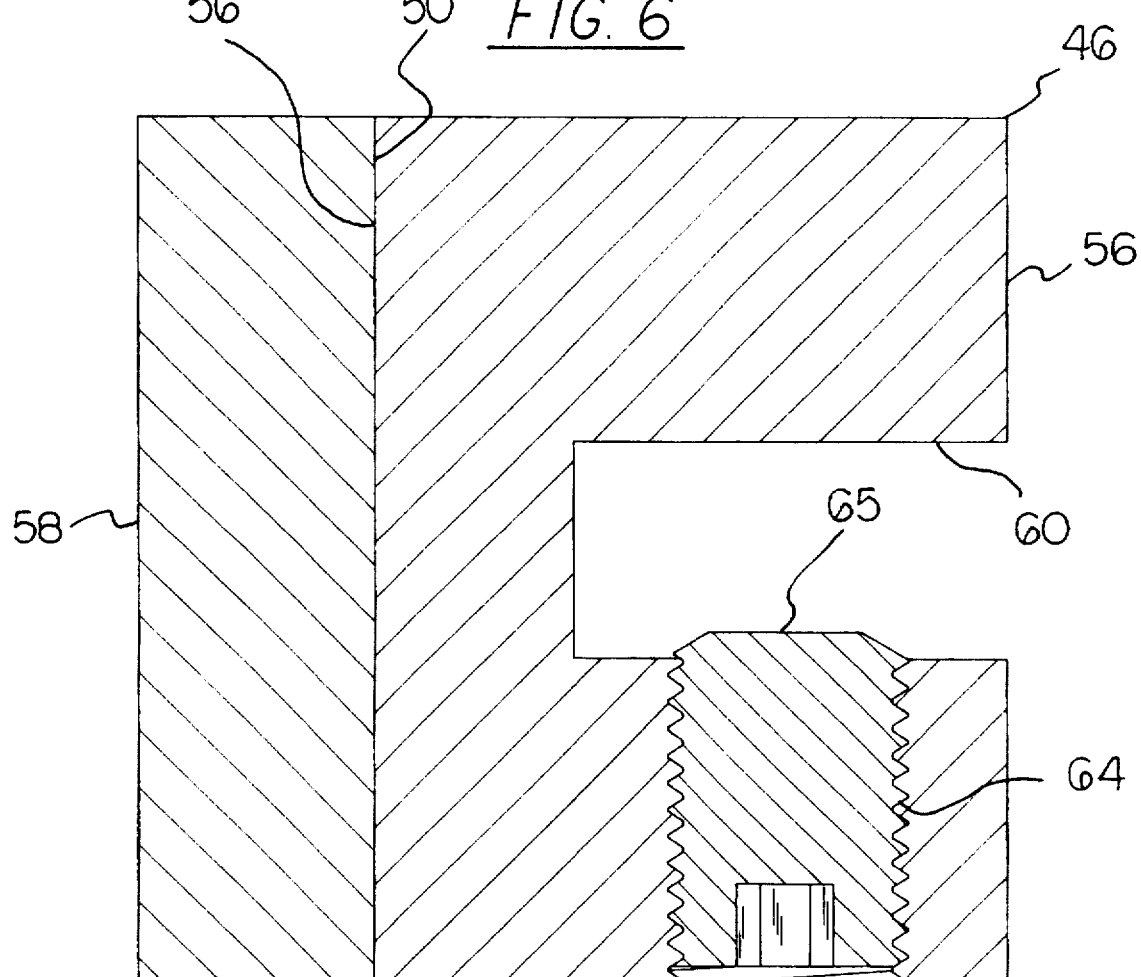
FIG. 7 is a cross-sectional view taken along line 7—7 shown in FIG. 6.

With reference now to the drawings, and in particular to FIG. 1 thereof, a new and improved wheelchair monitoring system embodying the principles and concepts of the present invention and generally designated by the reference numeral 10 will be described.

The present invention, the new and improved wheelchair monitoring system, is comprised of a plurality of components. Such components in their broadest context include a magnet sensor, sensor couple, magnet couple, display, primary switch, and information mechanism. Such components are individually configured and correlated with respect to each other so as to attain the desired objective.

More specifically, it will be noted that the system 10 of the present invention includes a standard wheelchair control mechanism 12 situated at a rear extent of a conventional wheelchair and connected to a standard battery supply. The wheelchair control mechanism is adapted to allow controlled movement of the wheelchair with an associated joy stick 14 which is connected thereto.

Also included is a magnet sensor 16 with a cylindrical configuration. The magnet sensor is adapted to actuate upon the placement of a magnet adjacent thereto.

For holding the magnet sensor in its operative orientation, as shown in FIG. 1, a sensor couple 18 with a generally rectangular configuration is included. In its preferred operative orientation, the sensor couple has a front surface 20, a rear surface 22, a top face 24, a bottom face 26, and a pair of side edges 28. The sensor couple comprises a first semicircular axial bore 30 vertically formed on the rear surface thereof. A second semicircular axial bore 32 is horizontally formed on a lower extent of the rear surface whereby the semicircular bores form an intersection with an aperture 34 situated at an apex thereof. The aperture allows the insertion of a coupling screw 36 with a sharp tip therethrough. The sensor couple further includes a first full axial bore 38 horizontally formed therein at an upper extent thereof and extended between the side edges. Intersecting the first full bore is a second full axial bore 40 horizontally formed in the housing and extended between the front surface and rear surface. An aperture 42 is situated at the intersection of the full bores and allows the insertion of a coupling screw 44 with a blunt tip therein from the top face. Ideally, the sensor couple is constructed of a light weight alloy including aluminum. The sensor couple is adapted to allow the securement thereof to any one of a plurality of wheelchairs. In an operative orientation, as shown in FIG. 1, one of the semicircular bores is attached to a frame of the wheelchair adjacent to a side extent thereof and the magnet sensor is insertably coupled within one of the full bores so that it faces outwardly from the side extent of the wheelchair frame in a horizontal direction. Optionally, the rear surface may be lined with an adhesive to afford additional securement to the wheelchair.

A magnet couple 46 having a generally rectangular configuration is also included. In a preferred operative orientation, as shown in FIG. 1, the magnetic couple has a front surface 48, a rear surface 50, a top face 52, a bottom face 54, and a pair of side edges 56. The magnet couple includes a magnet 58 attached to a first side edge thereof, a groove 60 formed on a second side edge for receiving a conventional spoke 62 of a conventional wheelchair wheel, and an aperture 64 formed between the front surface and the groove. The aperture is adapted to allow the insertion of a coupling screw 65 with a blunt tip for allowing the securement of the magnet in a position whereby it passes adjacent to the magnet sensor upon the revolution of the wheel thus allowing the activation thereof. The magnet may be situated at any radial distance from the axle of the wheelchair as long as the magnet sensor is situated at a similar radial distance.

A display 66 is connected to the standard control mechanism for depicting a plurality of numerals. A primary switch button 68 is also connected to the standard control mechanism and is adapted to actuate upon the depression thereof. So that button may be e switch button may be easily viewed and operated by a user, they are positioned adjacent to the joy stick and integrally manufactured therewith in a specially designed interface housing 70. The interface housing may be removably coupled to an arm rest of the wheelchair so as to prevent the theft thereof.

Finally, an information mechanism 72 is connected to the control mechanism and magnet sensor. To facilitate the connection with the control mechanism, a plurality of contact strips 74 depend from a lower surface of the information mechanism and are adapted to insert within a plurality of contact apertures 76 situated on an upper surface of the control mechanism. Coupling screws 77 may also be included to afford additional securement. The information mechanism is adapted to calculate a total distance of travel and a speed of the wheelchair by monitoring the number and rate of actuation of the magnet sensor, respectively. The information mechanism is further adapted to depict on the display the distance upon a first depression of the primary switch button and further depict the speed upon a subsequent depression thereof. Additional functions are also afforded by the information mechanism by subsequently depressing the primary push button switch. Such functions include a standard stop watch function, a standard clock function, and a resetable trip meter function. The information mechanism is further connected to a plurality of secondary push button switches 78 to facilitate the use of the additional functions. For example, when utilizing the trip meter function, a secondary push button switch may be depressed in order to reset an odometer reading depicted on the display. It should be noted that the information mechanism comprises commonly known circuitry in order to accomplish the tasks thereof. Optionally, the information mechanism may also be adapted to monitor a heart of a user or afford a conventional calculator or computer.

Additionally, the information mechanism may comprise a small battery and an associated switch 80 for supplying power to the information mechanism upon the removal of the standard battery supply. When the standard battery supply is removed to be replaced with a new one, the switch may be actuated to prevent loss of information such as the total odometer and clock reading.

The present invention offers a unique method of affording a plurality of features to a user of a wheelchair. Such features include a resetable trip meter which is purposefully included so as to allow a user to judge the amount of power remaining in the standard battery supply. Also, the stop watch and speedometer provide a means of tracking exercise activity. The wheelchair monitoring system may also be integrally manufactured with the wheelchair using methods similar to those disclosed hereinabove.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved wheelchair monitoring system comprising, in combination:

standard wheelchair control means situated at a rear extent of a conventional wheelchair and connected to a standard battery supply, the wheelchair control means allowing controlled movement of the wheelchair with an associated joy stick connected thereto;

a magnet sensor with a cylindrical configuration actuated upon the placement of a magnet adjacent thereto;

a sensor couple with a generally rectangular configuration having, in a preferred operative orientation, a front surface, a rear surface, a top face, a bottom face, and a pair of side edges, the sensor couple having a first semicircular axial bore vertically formed on the rear surface thereof and a second semicircular axial bore horizontally formed on a lower extent of the rear surface whereby the bores form an intersection with an aperture situated at an apex thereof for allowing the insertion of a coupling screw therethrough, the sensor couple further having a first full axial bore horizontally formed therein at an upper extent thereof and extended between the side edges and a second axial bore horizontally formed therein and extended between the front surface and rear surface whereby the full bores form an intersection with an aperture extending therethrough past the top face for allowing the passage of a coupling screw, the sensor coupling allowing the securement thereof to any one of a plurality of wheelchairs whereby one of the semicircular bores is attached to a frame of the wheelchair adjacent to a side extent thereof and further the magnet sensor is insertably coupled within one of the full bores so that it faces outwardly from the side extent of the wheelchair in a horizontal direction;

a magnet couple with a generally rectangular configuration having, in a preferred operative orientation, a front surface, a rear surface, a top face, a bottom face, and a pair of side edges, the magnet couple having a magnet attached to a first side edge, a groove formed on a second side edge for receiving a conventional spoke of a conventional wheelchair wheel, and an aperture formed between the front surface and the groove allowing the insertion of a coupling screw for securing the magnet in a position whereby it passes adjacent to the magnet sensor upon the revolution of the wheel thus allowing the activation thereof;

display means connected to the standard control means for depicting a plurality of numerals; and information means connected to the control means and magnet sensor, the information means calculating a distance the wheelchair travelled and a speed of the wheelchair by monitoring the number and rate of actuation of the magnet sensor respectively, the information means further depicting on the display means the distance upon a first depression of the primary switch button and depict the speed upon a second depression thereof.

2. A wheelchair monitoring system comprising:

a sensor means actuating upon a single rotation of a wheel of a wheelchair;

sensor coupling means for securing the sensor adjacent to the wheel of the wheelchair;

display means for depicting a plurality of numerals;

switch means actuating upon the depression thereof; and information means connected to the sensor means, display means, switch means, the information means calculating a distance the wheelchair travelled and a speed of the wheelchair by monitoring the number and rate of actuation of the sensor means respectively, the information means further depicting on the display means the distance upon a first depression of the switch means and depict the speed upon a second depression thereof, wherein the sensor means comprises a magnet sensor and an associated a magnet couple having, in a preferred operative orientation, a front surface, a rear surface, a top face, a bottom face, and a pair of side edges, the maanet couple having a magnet attached to a first side edge, a groove formed on a second side edge for receiving a conventional spoke of a conventional wheelchair wheel, and an aperture formed between the front surface and the groove allowing the insertion of a coupling screw for securing the magnet in a position whereby it passes adjacent to the magnet sensor upon the revolution of the wheel thus allowing the activation thereof, and wherein the coupling means comprises a sensor couple having, in a preferred operative orientation, a front surface, a rear surface, a top face, a bottom face, and a pair of side edges, the sensor couple having a first axial bore vertically formed on the rear surface thereof and a second semicircular axial bore horizontally formed on a lower extent of the rear surface whereby the bores form an intersection with an aperture situated at an apex thereof for allowing the insertion of a coupling screw therethrough, the sensor couple further having a first full axial bore horizontally formed therein at an upper extent thereof and extended between the side edges and a second axial bore horizontally formed therein and extended between the front surface and rear surface whereby the full bores form an intersection with an aperture extending therethrough at the top face for allowing the passage of a coupling screw, the sensor couple allowing the securement thereof to any one of a plurality of wheelchairs whereby one of the semicircular bores is attached to a frame of the wheelchair adjacent to a side extent thereof and further the sensor is insertably coupled within one of the full bores so that it faces outwardly from the side extent of the wheelchair in a horizontal direction.

* * * * *